Jan. 16, 1940.   J. G. COOK   2,187,554
PRINTER'S GAUGE
Filed Nov. 29, 1939   3 Sheets-Sheet 1
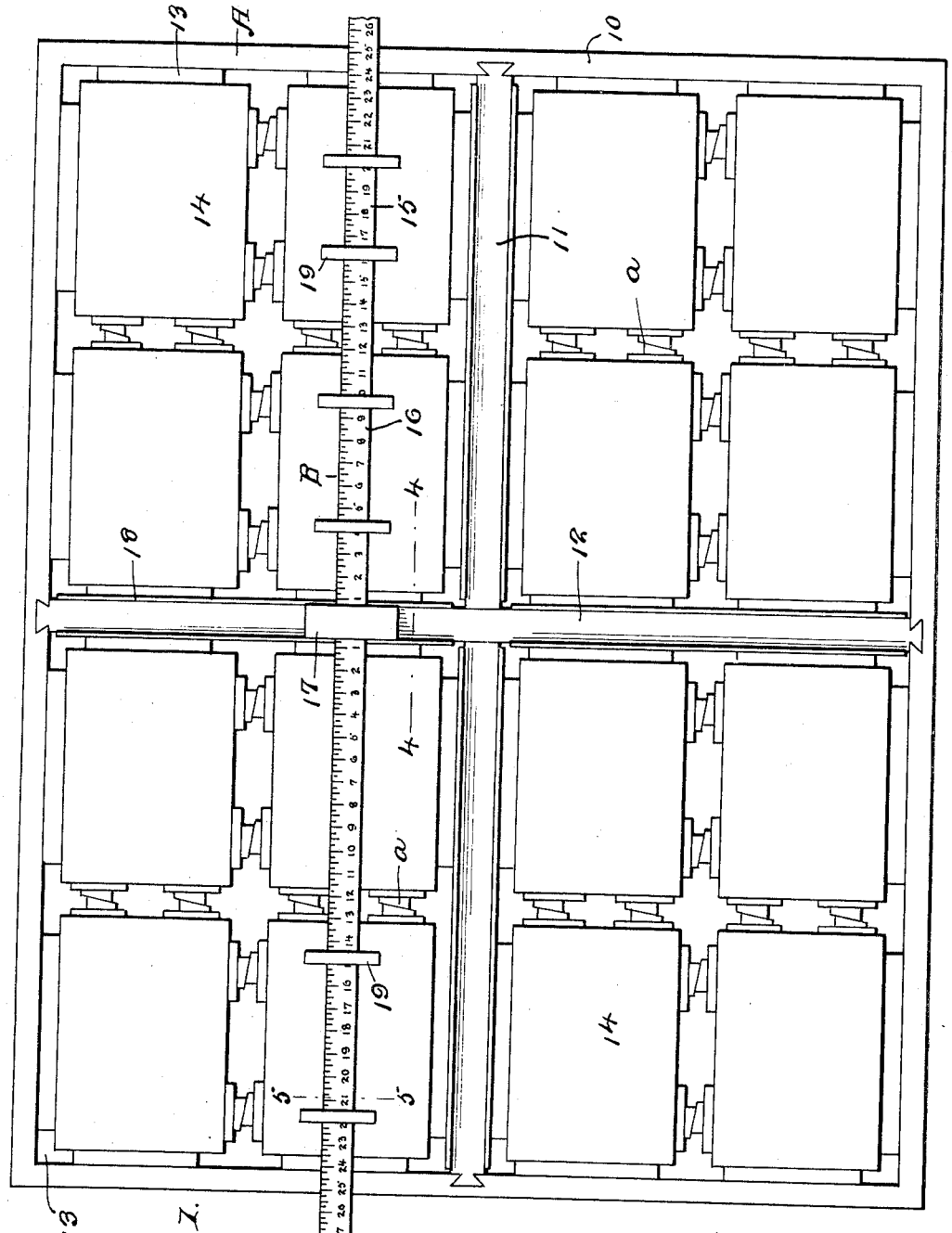

Jan. 16, 1940.                J. G. COOK                 2,187,554
                          PRINTER'S GAUGE
                       Filed Nov. 29, 1939           3 Sheets-Sheet 2
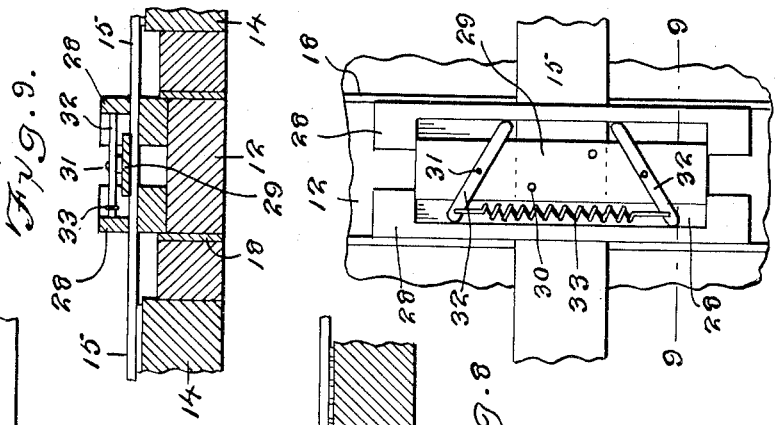
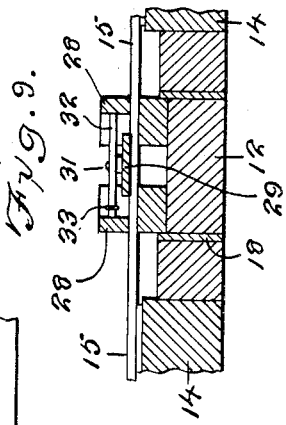
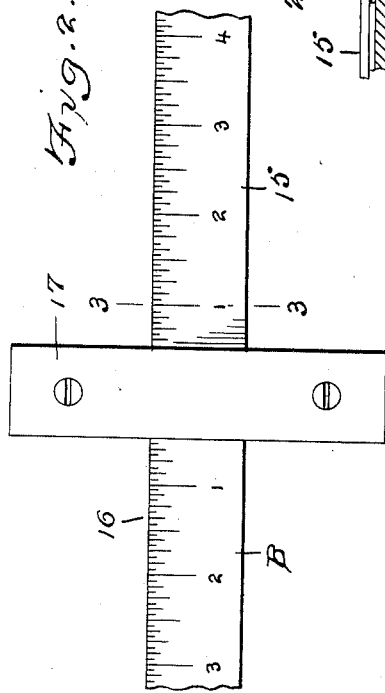
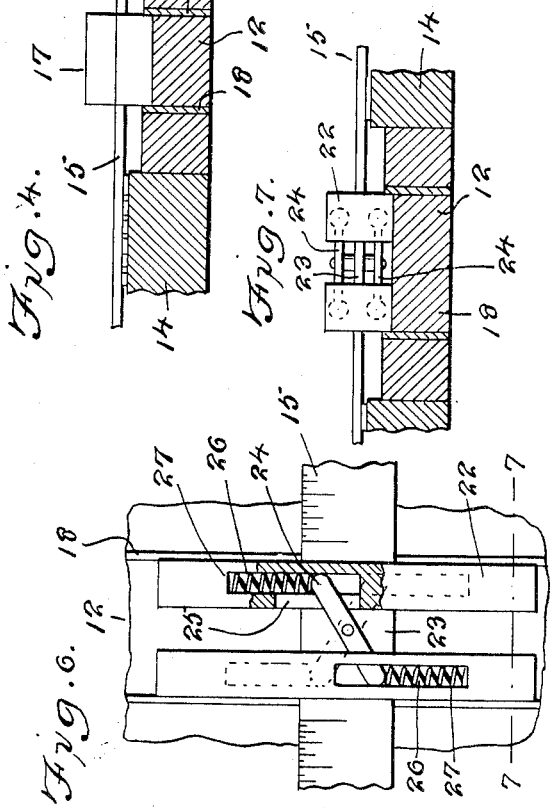
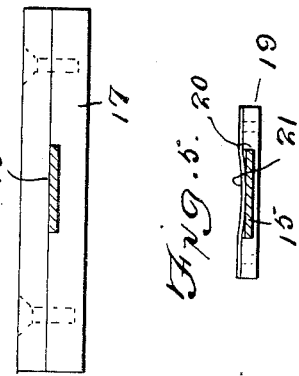
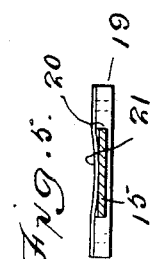
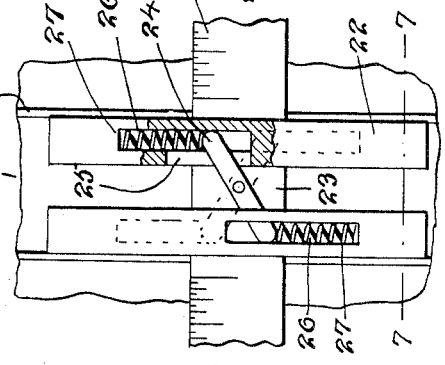
Jacob G. Cook
INVENTOR
BY Victor J. Evans & Co.
ATTORNEYS

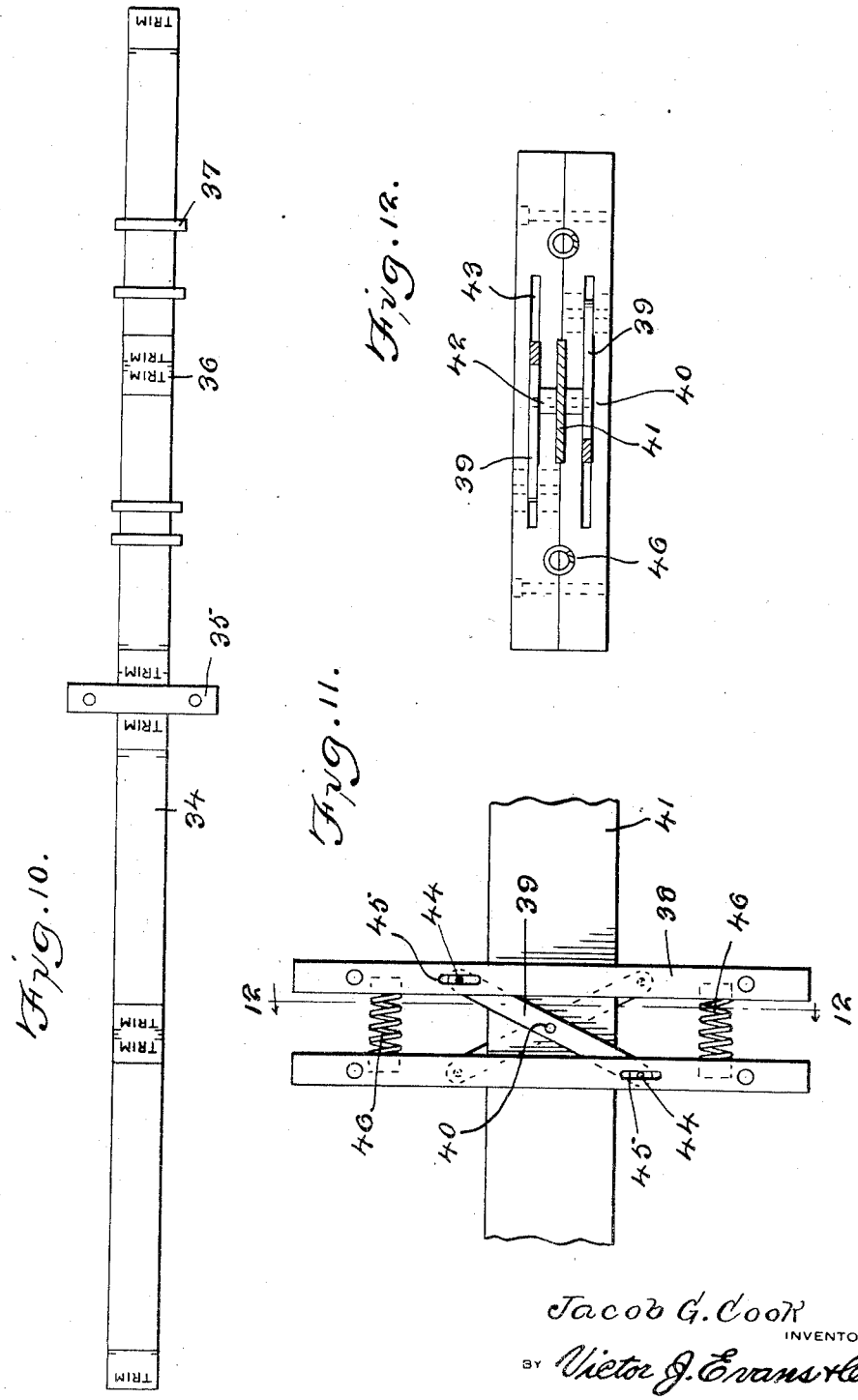

Patented Jan. 16, 1940

2,187,554

UNITED STATES PATENT OFFICE 2,187,554

PRINTER'S GAUGE

Jacob G. Cook, Albany, N. Y.

Application November 29, 1939, Serial No. 306,757

1 Claim. (Cl. 33—184.5)

The invention relates to a gauge and more especially to a print-form line-up and color registering gauge.

The primary object of the invention is the provision of a gauge of this character, wherein the same can be held fast at a cross rail or bar in a printing chase so as to enable measurements to be made by a printer with regard to the form locked or held within the chase for effecting accuracy in the lining up of the form for the printing of pages in folders, books, magazines or the like with the result that margins can be determined to the pages as well as accuracy in the locating of the latter for trueness within the chase for lock-up thereof prior to the form passing to the printing press for printing operation.

Generally the usual procedure in printing of folders, books, magazines or the like in locking up a form has been with the use of an ordinary foot rule and putting in margins that are somewhat close but are not accurate, then seeding the form to the printing press and pulling a press sheet for the line-up table, the press in the meantime being inconveniently and expensively held up awaiting shifts to be made in the form and such shifts can only be done after the sheet is lined up and moves are marked off thereon of pages of the matter to be printed which are out of true. Therefore, it is another object of the present invention to eliminate press hold-up and to assure the lock-up of forms accurately, the pages to the matter being readily spotted more quickly in accuracy of the line-up of the same while the form can be locked up with greater rapidity, the gauge being particularly advantageous in work where there are bleed pages and intricate color registration.

A further object of the invention is the provision of a device of this character, wherein a type form and color form can be readily and easily lined up with accuracy for trueness in the lay of the pages, both black and colored where in the printing of the pages for a folder, book, magazine or the like require the color form to strike into the black form as well as for the setting with accuracy of the margins of the pages and for showing the trim of bleed pages before printing of the forms.

A still further object of the invention is the provision of a gauge of this character, which is simple in construction, thoroughly reliable and efficient in operation, readily and easily applied to a printer's chase, assuring accuracy in the lining up of forms within the chase for page printing of folders, books, magazines or the like, strong, durable, and inexpensive to manufacture.

With these and other objects in view, the invention consists in the features of construction, combination and arrangements of parts as will be hereinafter more fully described, illustrated in the accompanying drawings, which disclose the preferred and modified forms of embodiment of the invention and pointed out in the claims hereunto appended.

In the accompanying drawings:

Figure 1 is a top plan view of a printer's chase showing the gauge constructed in accordance with the invention applied thereto for service in the line up of the forms within the chase for accuracy in page printing, both for black and colored forms.

Figure 2 is a fragmentary enlarged top plan view of the gauge detached or removed.

Figure 3 is a sectional view on the line 3—3 of Figure 2.

Figure 4 is a fragmentary sectional view on the line 4—4 of Figure 1.

Figure 5 is a sectional view on the line 5—5 of Figure 1.

Figure 6 is a fragmentary top plan view partly in section of a modified form of gauge.

Figure 7 is a sectional view on the line 7—7 of Figure 6.

Figure 8 is a view similar to Figure 6 showing a further modification.

Figure 9 is a sectional view on the line 9—9 of Figure 8.

Figure 10 is a top plan view showing a modified form of a straight measuring strip or blade for the gauge.

Figure 11 is a fragmentary top plan view showing a further modification of a clamping head for the gauge.

Figure 12 is a sectional view on the line 12—12 of Figure 11 looking in the direction of the arrows.

Similar reference characters indicate corresponding parts throughout the several views in the drawings.

Referring to the drawings in detail, particularly Figures 1 to 5 inclusive disclosing the preferred embodiment of the invention, A designates generally a printer's chase which is of conventional kind and in this instance is of a size for real large printing work including a permanent frame body 10 having the cross dividing rails or bars 11 and 12, respectively, these being at right angles to each other and are coupled with the frame at their ends in the ordinary well-known manner for dividing the said frame into equal form-receiving spaces 13. Adapted to be set in these form spaces 13 within the frame 10 as created by the bars or rails 11 and 12 are printing forms 14 which include both black and color forms for the printing of pages of a folder, book, magazine or the like when the form is passed into the printing press for the printing operation.

These forms 14 in the line-up within the chase 10 often times have to be shifted for accuracy in the printing of the pages, they being held in the chase through a lock-up including quoins $a$ as is customary. The chase A and the forms 14 are illustrated merely for the purpose of showing the application and the manner of use of the line-up gauge B constituting the present invention and hereinafter fully described.

The gauge B comprises a straight measuring strip or blade 15 having on one or both faces thereof lineal scales 16 while intermediate of the said strip or blade 15 and the scales 16 and fixed to said blade or strip is a cross head 17 which is of a width to be accommodated between leads 18 arranged at opposite sides of a cross bar 11 or 12 of the build of the chase frame 10 and in the lock-up of the said chase with the forms 14 therein this head 17 will be held fast between the leads 18 so that the strip or blade 15 will extend in opposite directions crosswise of the chase to lay upon the printing surfaces of the forms 14 within said chase for a purpose presently described.

Slidably fitted on the strip or blade 15 at opposite sides with respect to the head 17 fixed thereto are measuring runners 19, each being cut into to form a seat 20 accommodating the blade or strip 15 while carried by the said runner and bridging the seat 20 is a frictional grip 21 acting against the blade or strip 15 for holding the runner in an adjusted position upon said strip or blade. These runners cooperate with the scales 16, the latter being duplicated and reversely graduated at opposite sides of the head 17 on the strip or blade 15 for the line-up of the forms 14, both black and color forms for accuracy in the printing of pages of a folder, book, magazine or the like upon lock-up of such forms in the chase A and the transfer of the latter to a printing press. The runners 19 are manually shifted for measurement through cooperation thereof with the scales 16 on the strip or blade 15 and identify or indicate with accuracy the positioning of the forms in the chase A so that the black and color forms will register or strike in with each other during the printing operation with the result that a true line-up of the pages of the printed matter with the black and color forms in register with each other will be had. The runners 19 serve in measurements of margins and trim for the pages on the printing thereof after the lock-up of the chase A and the transfer to the printing machine.

In Figures 6 and 7 of the drawings there is shown a slight modification of the invention wherein the head of the gauge involves a clamping spreader head including a pair of companion spread members 22 which are slidably fitted with the blade or strip 15 at opposite sides of an anchoring piece 23 for the said head while pivoted upon the latter are swinging spread links 24 having their ends projecting through guideways 25 formed in the said members 22 and cooperating with these ends of the said links 24 are expansion springs 26 expansibly held in recesses 27 provided in said members 22 and function to spread the members 22 from each other for the clamping of the spread head in place upon the chase A between the leads 18 at any desired location following either bar or rail 11 or 12 permanently built in the said chase similarly to the placing of the head 17 hereinbefore described. In this manner the gauge in its entirety is locked to the chase A for the purposes hereinbefore stated.

In Figures 8 and 9 of the drawings there is shown a further modification of the invention wherein the spread head of the gauge involves a pair of displaceable members 28 slidably fitting the strip or blade 15 and arranged at opposite sides of an anchoring piece 29 for the said spread head, this piece being fastened at 30 to the strip or blade 15 while pivoted at 31 to the anchoring piece 29 laterally to opposite sides of the strip or blade 15 are spreader links 32, these fitting within the members 28 for effecting the spreading thereof and are connected for spreading action through the instrumentality of a coiled retractile spring 33. The members 28 operate similarly to the members 22 for the clamping of the gauge in place upon the chase A.

In Figure 10 of the drawings there is shown a modified form of a straight measuring strip or blade which is denoted at 34 and medially thereof has detachably fixed thereto a cross head 35, in this instance similar to the head 17 and on the uppermost or reading side of the blade or strip 34 is indicated a special scale 36 for one magazine or book or a group of magazines or books that have the same size page and the same size margins, the margins and the trim size of books or magazines being marked upon this strip or blade so that a printer need only lay a gauge on a form to have the gauge fit over the top of one of the cross bars of the chase and on the locking up of the form a row of pages in a single operation may be measured and in this way keeps the rows in line with each other because each row is measured from the form cross bar sideways and from the other cross bar when measuring the heads and the bottoms of the pages. When the pages are put in position sideways, the gauge is turned around on reverse side and set on the other cross bar of the chase to register heads and bottoms of pages. This strip or blade 34 carries the adjustable runners 37, which are identical to the measuring runners 19 hereinbefore described.

In Figures 11 and 12 of the drawings there is shown a further modified form of expansion head including a pair of companion spread members 38, these being slidably fitted upon the blade or strip 15 or 34 while between these members 38 are the crossed spreading links 39 arranged at opposite faces of the strip or blade and at the crossing point of these links 39 is fitted a pivot 40 which is stationarily fixed in the strip or blade 41 upon which slide the members 38, there being spacer collars 42 between the blade or strip and the said links for spacing the same properly from each other. These links 39 at their outer ends fit in clearances or slots 43 provided in the members 38 and have slidable and pivotal connection at 44 with the said members 38, the pivots 44 connecting the links 39 with the said members 38 being loosely fitted in slots 45 provided in said members 38. Seated in the members 38 and located between the same are coiled compression springs 46, these functioning to spread the members 38 apart with respect to each other for clamping action thereof when the said spreader head is to fasten the gauge with the strip or blade 41 in proper position to the chase frame, the members 38 being adapted to operate similarly to the members 22 and 28, respectively, and thus clamping the gauge in place upon the chase A for the purposes hereinbefore set forth.

As before described and shown, the gauge can be made up with a solid head or with an expansion type head, examples of these having been hereinbefore set forth.

What is claimed is:

A gauge of the character described comprising a straight blade, a cross head intermediate of the ends of said blade, runners movably fitted upon said blade at opposite sides of said head, clamping means included with the head for the fastening thereof to a printer's chase at a permanent cross bar of the same, said clamping means involving opposed parallel relatively movable members, toggle acting spreader links arranged between the members, and springs active for the spreading of the said members into clamping position with respect to the permanent cross bar of the chase.

JACOB G. COOK.